United States Patent [19]

Nonomura et al.

[11] Patent Number: 4,803,885

[45] Date of Patent: Feb. 14, 1989

[54] TORQUE MEASURING APPARATUS

[75] Inventors: Yutaka Nonomura, Nagoya; Kouji Tsukada, Seto; Yuji Nishibe, Aichi; Masaharu Takeuchi, Owariasahi, all of Japan

[73] Assignee: Kabushiki Kaisha Toyota Chuo Kenkyusho, Aichiken, Japan

[21] Appl. No.: 39,390

[22] Filed: Apr. 17, 1987

[30] Foreign Application Priority Data

Apr. 21, 1986 [JP] Japan .................................. 61-91910

[51] Int. Cl.⁴ .............................................. G01L 3/10
[52] U.S. Cl. .............................. 73/862.36; 73/DIG. 2
[58] Field of Search ...................... 73/862.36, DIG. 2; 324/209

[56] References Cited

U.S. PATENT DOCUMENTS 4,406,168  9/1983  Meixner ........................... 73/DIG. 2
4,479,390 10/1984  Meixner ........................... 73/DIG. 2

FOREIGN PATENT DOCUMENTS 580465 11/1977 U.S.S.R. ............................ 73/862.36

OTHER PUBLICATIONS

ASEA Journal 1960, vol. 33.3, pp. 23-32, The Ring Torductor-A Torque-Guage, without Slip Rings, for Industrial Measurement and Control.

Primary Examiner—Charles A. Ruehl
Attorney, Agent, or Firm—Oblon, Fisher, Spivak, McClelland & Maier

[57] ABSTRACT

A torque measuring apparatus including a magnetic detection device for non-contact measuring strains in a rotating shaft of ferromagnetic material which is adapted to transmit torques, the detected strains being used to determine the levels of transmitted torques, the magnetic detection device including an exciting coil device wound around the outer periphery of the rotating shaft and adapted to magnetize the rotating shaft in its axial direction; a detecting core ring device in the form of an integral unit which includes a plurality of detecting cores arranged around the circumferential area of the rotating shaft to be magnetized equidistantly to form a ring, each of the detecting cores forming an independent magnetic circuit between the detecting core and the rotating shaft; and at least one magnetic detecting element for detecting a variable magnetic flux in each of the detecting cores depending on the level of the transmitted torque; whereby the strains in the rotating shaft can be non-contact measured based on the sum of detection signals from the magnetic sensors each of which is formed by each of the detecting cores and the corresponding magnetic detecting elements.

17 Claims, 11 Drawing Sheets

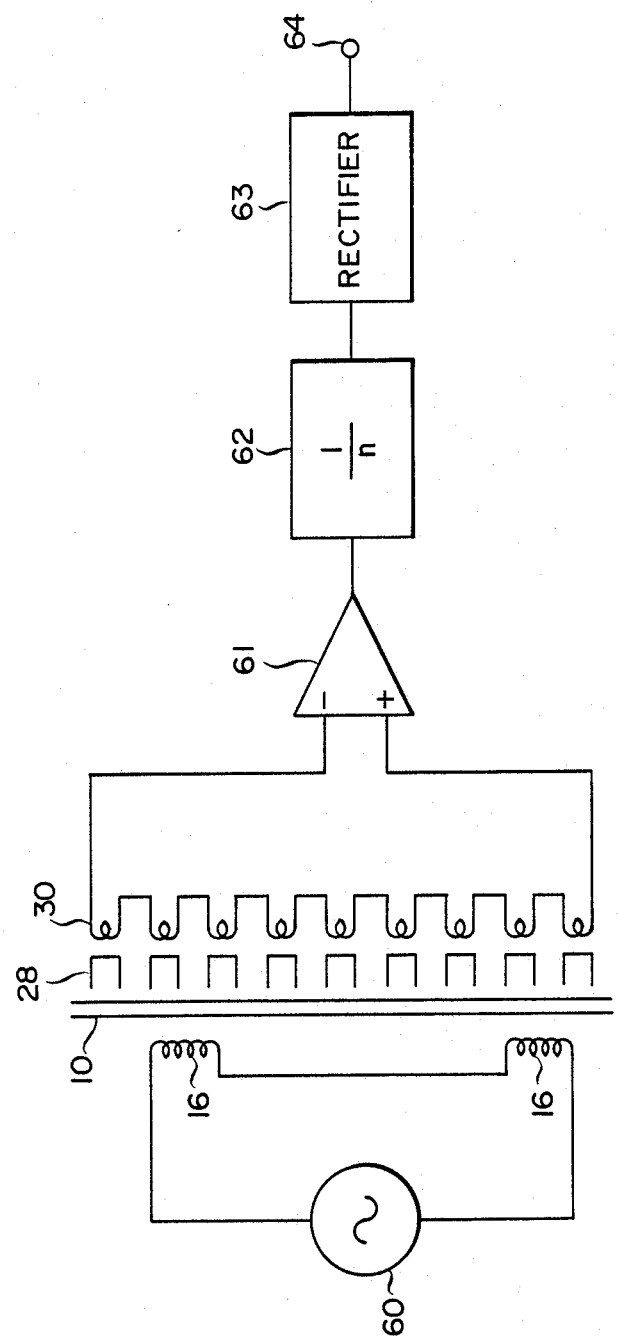

TORQUE MEASURING APPARATUS

BACKGROUND OF THE INVENTION

1. Field of the Invention

The present invention relates to an improved torque measuring apparatus particularly suitable for use in non-contact measurement of torque transmitted through a rotating shaft of ferromagnetic material.

2. Description of the Prior Art

In various rotary drive systems, it is important that a transmitted torque can be measured accurately and simply. The accurate measurement of torque is very desirable for analysis or grasp of running drive systems used in various fields of industry.

Generally, such rotary drive systems includes various prime movers such as automobile engines, electric car motors, industrial motors and so on. Analysis of the running prime movers requires accurate measurement of torque in addition to revolution.

Particularly, the vehicle engines can properly be controlled relating to their ignition timing, fuel injection, gearshift timing or gear ratio by measuring torques in the power train consisting of engine, transmission, propeller shaft, gear wheels and so on. The measurement of torque serves to improve fuel consumption or running characteristics.

It has been desired to develop a small-sized apparatus which can steadily measure torques over a wide range of revolutions.

In the rotary drive systems, it is known that a rotating shaft for transmitting torques has a strain created therein, which is proportional to the transmitted torque. Thus, the level of the transmitted torque can be known by measuring such a strain.

A torque measuring system for detecting a strain created in a rotating shaft by the use of magnetostriction effect is well-known, for example, from "ASEA Journal" 1960, Vol. 33.3, pp 23-32 or SEA 820904. A portion of the rotating shaft for transmitting the torques is formed of ferromagnetic material. Non-contact measurement of torque is accomplished by measuring the strain in the rotating shaft by the use of a magnetic sensor.

FIGS. 4 and 5 of the accompanying drawings schematically show a prior art torque measuring apparatus on a rotating shaft 10 in a vehicle engine. FIG. 4 is a schematic side view of the torque measuring apparatus while FIG. 5 is a schematic cross-section taken along a line V—V in FIG. 4.

Creation of Strain

As is well-known, a torque generated in the engine is transmitted through the rotating shaft 10. At this time, the rotating shaft 10 will have a compressive stress produced therein at an angle of +45° relative to the axial direction of the shaft and a tensile stress generated in the shaft at an angle of −45° relative to the axial direction of the shaft. These stresses are proportional to the transmitted torque.

As a result, the rotating shaft 10 will have an anisotropic strain having a magnitude proportional to the level of the transmitted torque. If the rotating shaft 10 is formed of ferromagnetic material, the magnitude of the anisotropic strain generated can be detected magnetically by the use of magnetostriction effect in the non-contact manner to measure the level of the transmitted torque.

Construction of the Torque Measuring Apparatus

To this end, the torque transmitting shaft 10 of such torque measuring systems is totally formed of ferromagnetic material or includes a skin layer of ferromagnetic material attached to the surface of the rotating shaft 10.

A magnetic detection device 12 is opposed to and spaced apart from the ferromagnetic shaft 10 to effect the non-contact measurement of the strain in the rotating shaft 10.

Generally, the magnetic detection device 12 comprises means for magnetizing the ferromagnetic rotary shaft 10 and means for detecting the variable level of the magnetic field in the shaft 10 by the use of magnetostriction effect.

Particularly, the magnetic characteristics of the ferromagnetic rotary shaft 10 is very variable around the outer periphery thereof for various reasons such as non-uniform distribution of residual strain, non-uniform crystalline structure, non-uniform distribution of impurities (for example, carbon) and so on.

In order to effect the accurate measurement of the transmitted torque without such affections, it is therefore preferred that a plurality of exciting and detecting means are arranged around the outer periphery of the rotating shaft 10 to surround the latter.

Thus, the prior art magnetic detection device 12 includes an exciting core ring 14 and two detecting core rings 18, which rings are disposed around the outer periphery of the rotating shaft 10.

Each of these core rings 14 and 18 includes four magnetic pole pieces (14a, 14b, 14c and 14d or 18a, 18b, 18c and 18d) which extend from its inner periphery inwardly toward the center of the core ring. Each of the magnetic pole pieces on the exciting core ring 14 has an exciting coil 16 wound therearound, while each of the magnetic pole pieces on the detecting core ring 18 includes a detecting coil 20 wound therearound.

As shown in FIG. 4, the exciting core ring 14 is held between the pair of detecting core rings 18 through a retainer 20. The detecting core rings 18 are fixed to each other to position one of the magnetic pole pieces on one core ring 18 relative to the corresponding one of the magnetic pole pieces on the other core ring 18 at the same angle of rotation. Moreover, the exciting core ring 14 is arranged such that the respective one of the magnetic pole pieces thereon willb e positioned at an angle of rotation intermediate between the angles of rotation in the respective magnetic pole pieces of the detecting core rings.

By driving the exciting coils 16 such that the magnetic pole pieces of the exciting core ring 14 will alternately be magnetized into magnetic north and south poles (for example, the magnetic pole pieces 14a and 14c into south pole while the magnetic pole pieces 14b and 14d into north pole), the outer periphery of the rotating shaft 10 is magnetically divided into four excited sectors each of which will be magnetized into a magnetic direction opposite to that of one of the adjacent excited sensors.

Each of the detecting core rings 18 forms four magnetic circuits which consist of the detecting core ring 18 and the respective excited sensors of the rotating shaft 10 through the four magnetic pole pieces of the detecting core ring 18. Each of the magnetic pole pieces 18a, 18b, 18c and 18d on each of the detecting core rings 18 is paired with the corresponding detecting coil 20 to function as a magnetic sensor (100-a, 100-b, 100-c or 100-d) which is disposed around the rotating shaft.

The summed outputs of the magnetic sensors 100 from their detection coils 20 can be used to effect the non-contact measurement of a strain created on the peripheral surface of the rotating shaft 10.

For example, if no torque is applied to the rotating shaft 10, any anisotropic strain will not be created on the surface of the rotating shaft 10 to provide the same magnetic potential on the shaft surface sections corresponding to the respective magnetic pole pieces (18a, 18b, 18c and 18d). As a result, the detection coils 20 on the magnetic pole pieces will provide no electromotive force while the sum of the detected signals is equal to zero.

On the contrary, if a torque is applied to the rotating shaft 10, an anisotropic strain is created on the surface of the rotating shaft. There will thus be produced a difference of magnetic potential between the surface sections of the rotating shaft 10 corresponding to one set of magnetic pole pieces (18a and 18c) and the other set of magnetic pole pieces (18b and 18d), respectively. Therefore, the detection coils 20 on the respective magnetic pole pieces will produce an electromotive force. The sum of the detected signals will be proportional to the level of the transmitted torque.

In such a manner, the level of the transmitted torque can be measured by summing signals outputted from the detecting coils 20 of the magnetic sensors 100.

However, the prior art torque measuring systems have the following problems:

(A) If the outer periphery of the rotating shaft 10 is not magnetically divided, the measurement of the transmitted torque cannot be accomplished. Because the outer periphery of the shaft 10 is magnetically divided, the reverse of magnetization is provided alternately around the outer periphery of the rotating shaft, resulting in non-uniform magnetization. It is therefore difficult to provide the same characteristics of detection from one of the magnetic sensors to the other. As a result, the measurement will easily be influenced by variations of output due to the non-uniformity around the outer periphery of the rotating shaft 10.

(B) The transmitted torque cannot be measured more responsibly. More particularly, the prior art torque measuring systems provide variations of output from the sensors 100 due to the non-uniformity around the outer periphery of the rotating shaft 10 when it is being rotated.

It is required to eliminate the variations by outputting detection signals from the respective one of the sensors 100 through a low-frequency filter which has a frequency sufficiently lower than the revolution of the rotating shaft 10. However, this cannot improve the real-time responsibility in measurement of the transmitted torque. Thus, the measured data cannot be used to provide real-time control.

(C) Finally, the prior art torque measuring systems cannot have a number of magnetic sensors 100 arranged around the outer periphery of the rotating shaft 10.

In order to effectively reduce the affection of the non-uniformity around the outer periphery of the rotating shaft 10 for exact measurement, the number of magnetic sensors 100 arranged around the periphery of the rotating shaft 10 should be increased as much as possible.

As shown in FIG. 5, however, the prior art systems must include the pairs of magnetic pole pieces (18a, 18b, 18c and 18d) on the detecting core rings 18 and the pairs of magnetic pole pieces (14a, 14b, 14c and 14d) on the exciting core ring 14, these pairs being utilized to function as magnetic sensors. This requires very severe limitations with respect to dimensioning. Thus, the prior art can at most provide four magnetic pole pieces for exciting and detecting core rings or eight magnetic pole pieces for exciting and detecting core rings for a shaft having an increased diameter.

Furthermore, the prior art systems have a common and inseparate part of the magnetic circuits for the respective detecting coils 20. Thus, the magnetic circuits will magnetically interfere with one another. This is also a reason why the number of the magnetic sensors 100 cannot be increased.

As stated in the above (A) to (C), the prior art torque measuring systems are subject tothe effect of the non-uniformity around the outer periphery of the rotating shaft. As a result, the transmitted torque cannot exactly be measured by the prior art.

SUMMARY OF THE INVENTION

It is therefore an object of the present invention to provide a torque measuring apparatus which cannot be influenced by any non-uniformity around the periphery of the rotating shaft and which can more responsibly effect the accurate measurement of a transmitted torque through a widened range from the stationary state of the rotating shaft to the high-speed revolution of the same.

To this end, the present invention provides a torque measuring apparatus comprising magnetic detection means for non-contact detecting the strain in a rotating shaft used to transmit the torque, the strain so detected being used to measure the transmitted torque, said magnetic detection means comprising exciting coil means non-contact wound around said rotating shaft and capable of magnetizing said rotating shaft in the axial direction, integrally molded detecting core ring means including a plurality of detecting cores equidistantly arranged into a ring around the excited sections of said rotating shaft, each of said detecting cores being adapted to form a magnetic detection circuit independently between said detecting core and said rotating shaft, and magnetic detecting elements for detecting the magnetic field in each core which is variable depending on the level of the transmitted torque, said detecting cores and said magnetic detecting elements forming a plurality of magnetic sensors from which output detection signal are generated, the sum of said output detection signals being used to effect the non-contact measurement of the strain in said rotating shaft.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a block diagram of a signal processing circuit used in the first embodiment of the present invention.

DESCRIPTION OF THE PREFERRED EMBODIMENTS

A torque measuring apparatus of the present invention comprises magnetic detection means for non-contact detecting the strain in a rotating shaft used to transmit the torque, the strain so detected being used to measure the transmitted torque, said magnetic detection means comprising exciting coil means non-contact wound around said rotating shaft and capable of magnetizing said rotating shaft in the axial direction, integrally molded detecting core rings means including a plurality of detecting cores equidistantly arranged into a ring around the excited sections of said rotating shaft, each of said detection cores being adapted to form a magnetic circuit independently between said detectgn core and said rotating shaft, and magnetic detecting elements for detecting the magnetic field in each core which is variable depending on the level of the transmitted torque, said detecting cores and said magnetic detecting elements forming a plurality of magnetic sensors from which generate detection output signals, the sum of said detection output signals being used to effect the non-contact measurement of the strain in said rotating shaft.

In such an arrangement, the rotating ferromagnetic shaft may be formed by attaching a layer of ferromagnetically material on the external surface of the rotating shaft around the circumference thereof. Alternatively, the rotating shaft itself may totally be formed of ferromagnetic material.

The ring of detecting cores may be replaced by a continuous core ring such as ring-shaped iron core which is divided into a plurality of independent detection cores by a plurality of conductive rings intersecting the continuous core ring.

Apart from this, said detecting core ring may be replaced by a continuous core ring which is divided into a plurality of independent detection cores by elongated gaps formed therein along the circumference of the ring with a predetermined space interval.

Furthermore, the detecting core ring may be formed into an integral unit by using any suitable non-magnetic material such that a plurality of U-shaped detecting cores will be formed equidistantly in the surface of the rotating shaft around its circumference.

Principle of Invention

The torque measuring apparatus of the present invention will now be described briefly relating to its principle.

Prior to the present invention, the inventors had analyzed a case where a single magnetic sensor was used and another case where a pluraltiy of magnetic sensors were used, to study variations of measurement signals for transmitted torques due to the non-uniformity of magnetic characteristics around the outer periphery of a rotating and torque transmitting shaft which was of ferromagnetic material.

A single magnetic sensor was first analyzed relating to its output detection signal $S_0$.

Figure 6:
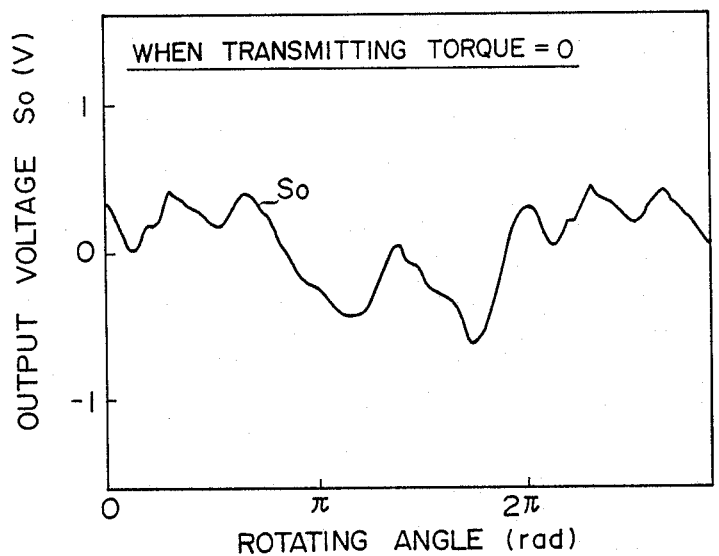
FIGS. 6 and 7 illustrate waveforms of output signals on using a single magnetic sensor.

FIG. 6 shows measurement data obtained when the shaft is rotated at a revolution speed equal to 3.5 ($S^{-1}$) with its transmitted torque equal to zero. As seen from this figure, the output signal $S_0$ from the single magnetic sensor was very influenced by output variations in the rotation of the shaft even when the transmitted torque was equal to zero. Such output variations are equivalent to about 1000 Nm of torque. It is understood that the accurate measurement of the transmitted torque in the rotating shaft is very difficult in the presence of such output variations.

When a plurality of magnetic sensors were equidistantly arranged around the outer periphery of the rotating shaft, a value P obtained by averaging the sum of output detection signals from the magnetic sensors was analyzed.

As shown in FIG. 6, the output signal $S_0$ from one of the magnetic sensors can be represented as a function relating to the rotational angle of the rotating shaft. The output signal $S_0$ can be subjected to Fourier expansion with respect to a cycle $2\pi$ (rad.):

$$S_0(x) = A_0 + A_1 \cos X + A_2 \cos 2X + A_3 \cos 3X + \ldots \quad (1)$$
$$= \sum_{i=0}^{\infty} A_i \cos iX$$

where i is an integer.

Figure 7:
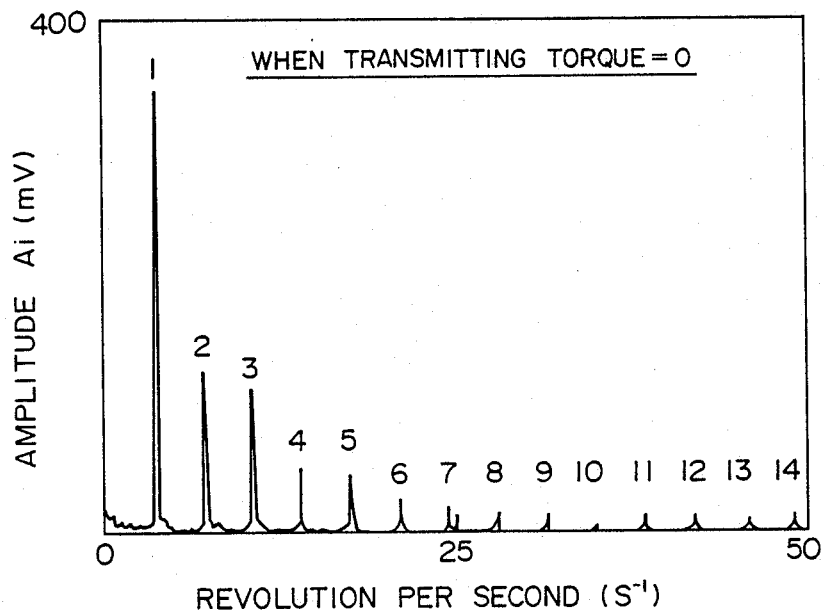

FIG. 7 shows the spectrum of the output signal $S_0$ shown in FIG. 6 as an amplitude Ai which is ranged from the first order to the fourteenth order in revolution per second.

Where a single magnetic sensor is used, its output $P_1$ is represented by the following equation:

$$P_1 = S_0(x) \quad (2)$$

Where to magnetic sensors are symmetrically arranged on the opposite sides of the rotating shaft, the outputs from these sensors are added and averaged to provide a value $P_2$ which is represented by the following equation:

$$\begin{aligned} P_2 &= (\tfrac{1}{2})\{ S_0(x) + S_0(x + \pi)\} \quad (3) \\ &= (A_0/2)(1 + 1) + \\ &\quad (A_1/2)\{\cos X + \cos(X + \pi)\} + \\ &\quad (A_2/2)\{\cos 2X + \cos(2X + 2\pi)\} + \ldots \\ &= \sum_{i=0}^{\infty} A_i \cos 2iX \quad (4) \end{aligned}$$

As will be apparent from the fourth equation, the summed and averaged value $P_2$ loses any odd term on Fourier expansion.

Where three magnetic sensors are arranged symmetrically with respect to the rotating shaft, output detection signals from these magnetic sensors are average to provide a value $P_3$ which in turn is subjected to Fourier expansion as follows:

$$P_3 = (\tfrac{1}{3})\{S_0(x) + S_0(x + 2\pi/3) + S_0(x + 4\pi/3)\} \quad (5)$$
$$= (A_0/3)\{1 + 1 + 1\} +$$
$$(A_1/3)\{\cos X + \cos(X + 2\pi/3) + \cos(X + 4\pi/3)\} +$$
$$(A_2/3)\{\cos 2X + \cos(2X + 4\pi/3) + \cos(2X + 8\pi/3)\} +$$
$$(A_3/3)\{\cos 3X + \cos(3X + 2\pi) + \cos(3X + 4\pi)\} + \ldots$$
$$= \sum_{i=0}^{\infty} A_{3i} \sin 3iX \quad (6)$$

As a result, the average value $P_n$ from the magnetic sensors equal to n in number and symmetrically arranged with respect to the rotating shaft will be represented by a general equation as follows:

$$P_n = \sum_{i=0}^{\infty} A_{in} \cos in\, X \quad (7)$$

If the average value $P_n$ is obtained as a detection signal, therefore, Fourier expansion terms other than the term (in) will be lost. This shows that the output variations due to the non-uniformity of magnetic characteristics around the rotating shaft can be eliminated sufficiently.

Points Aimed At

In order that such an analysis can be realized, it is required that the magnetic sensors have the same output characteristics and are equidistantly arranged around the circumference of the rotating shaft. If these conditions should not be fulfilled, the output variations cannot satisfactorily be eliminated with an increased precision.

As will be apparent from the above analysis, the following points (a) through (c) will be very important for the torque measuring apparatus.

(a) First of all, the magnetic sensors must have the same output characteristics. In order to eliminate the variations of rotational output, it is important that the rotating shaft is uniformly excited to provide a uniform magnetization on the outer periphery of the rotating shaft opposed to the magnetic sensors.

(b) As seen from the seventh equation, Fourier expansion terms which are controllable depend on the number of the sensor elements. As the number of the sensors is increased, therefore, the capability of the measuring apparatus can correspondingly be improved. It is thus important that the number of magnetic sensors to be arranged independently around the rotating shaft is increased as much as possible.

(c) It is further required that the magnetic sensors are properly arranged equidistantly around the circumference of the rotating shaft. To this end, it is important that the magnetic sensors are provided as an integral unit.

In view of the above points, the present invention is characterized by providing a torque measuring apparatus which can uniformly magnetize the rotating shaft, which can increase the number of the magnetic sensors arranged around the rotating shaft and which can provide a unitary set of the magnetic sensors to improve the precision in assembling.

Thus, the present invention can effectively eliminate the variations of rotational output due to the non-uniformity of the magnetic characteristics around the circumference of the torque transmitting shaft without affection of the revolution of the rotating shaft such that the transmitted torque can be measured more accurately and responsibly.

The torque measuring apparatus so constructed in accordance with the present invention will further be described with respect to its operation.

Excitation of the Rotating Shaft

The torque measuring apparatus of the present invention comprises an exciting coil coaxially wound around the rotating shaft without contacting. When the exciting coil is driven by alternate exciting currents, the rotating shaft will be magnetized axially at its area in which a torque is to be detected.

The rotating shaft is formed of ferromagnetic material with its magnetic permeability being very large in comparison with gaseous media such as air and others. On excitation, thus, magnetic fluxes will pass through the rotating shaft concentrically. Even if the exciting coil is slightly misaligned with the center of the rotating shaft, therefore, the rotating shaft can uniformly be magnetized, particularly, around the outer periphery thereof.

Magnetic Sensor

The torque measuring apparatus of the present invention also comprises a detecting core ring coaxially arranged around the magnetized area of the rotating shaft. The detecting core ring is divided into a plurality of detecting cores each of which forms an independent magnetic circuit for detecting the magnetization component of the magnetized area of the rotating shaft which is located under the detecting core.

When a torque is applied to the rotating shaft, magnetization components are created around the circumference of the rotating shaft because of the magnetostriction effect. This will appear as changes of magnetic fluxes in the magnetic circuits.

A magnetic sensor is formed by each of the detecting cores and the corresponding magnetic detecting elements.

Thus, the magnetic detecting element of each of the magnetic sensors will output a voltage proportional to the magnetized component created in the rotating shaft, that is, the level of the transmitted torque.

Particularly, since the present invention provides the magnetic circuits of the detecting cores which are magnetically separated from one another, no interference will occur between eaach adjacent sensors even if the number of the detecting cores or the number of the magnetic sensors is increased.

In accordance with the present invention, the effect due to the non-uniformity of magnetic characteristics around the circumference of the rotating shaft can be eliminated to provide an accurate measurement of the transmitted torque since the rotating shaft can uniformly be magnetized around the circumference thereof and yet since a number of magnetic sensors can be arranged around the circumference of the rotating shaft.

In accordance with the present invention, furthermore, the detecting cores are formed into an integral ring surrounding the rotating shaft to provide the following advantages:

(1) There can be provided the same and more precise clearance between each of the pole piece end faces and the outer peripheral face of the rotating shaft.

(2) The detecting cores can be arranged more precisely and equidistantly.

(3) The group of the magnetic sensors can easily be positioned and assembled simply by aligning the axial center of the rotating shaft with the center of the detecting core ring.

As a result, the detecting elements can have the same detecting ability to fulfill the requirement as defined by the seventh equation.

Actual Measurement Data

Figure 8:
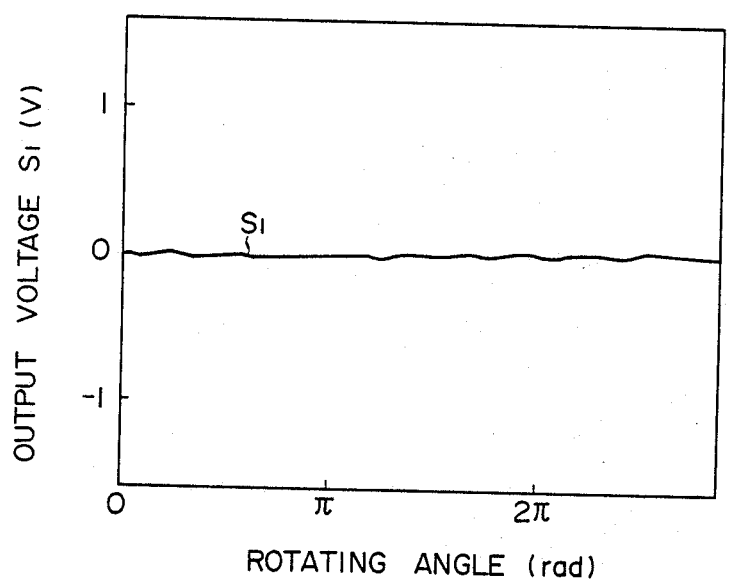
FIGS. 8 and 9 illustrate waveforms of output signals in the first embodiment of the present invention.
Figure 9:
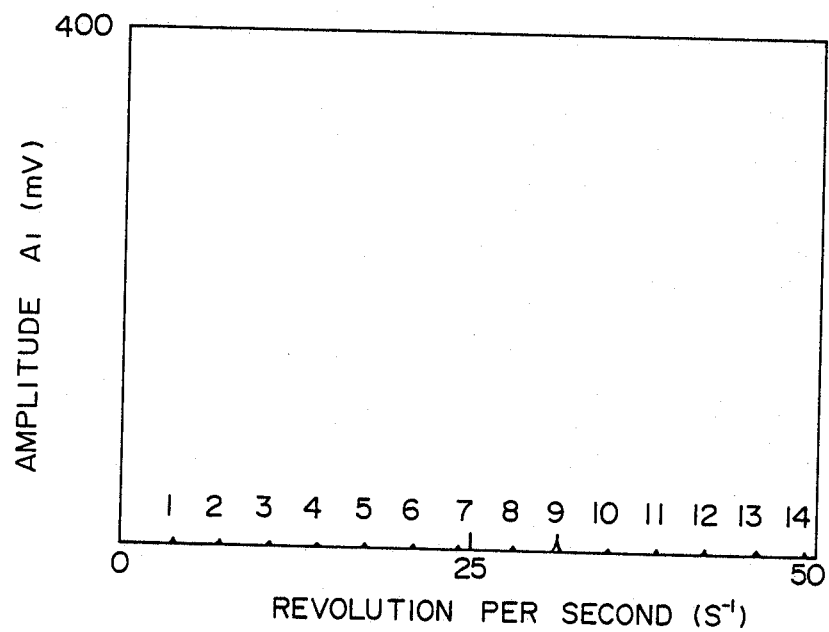

FIGS. 8 and 9 show actual measurement data of the torque measuring apparatus according to the present invention. The data was obtained by providing nine magnetic sensors around the rotating shaft and measuring the sum of output voltages $S_1$ from the magnetic sensors when the applied torque is equal to zero.

As described hereinbefore, a single magnetic sensor is influenced by the non-uniformity of magnetic characteristics around the outer periphery of the rotating shaft, that is, the torque transmitting shaft. The output of the magnetic sensor will include such variations of rotational output as shown in FIGS. 6 and 7.

However, the torque measuring apparatus of the present invention can provide such outputs as shown by $S_1$ in FIG. 8. This shows the fact that variations in the rotational output of the rotating shaft can be eliminated very well.

Thus, the torque measuring apparatus of the present invention can effect precise measurement of torque over a widened range from the stationary state of the torque transmitting shaft to the high-speed running states of the same. Moreover, the measurement data can be real-time outputted from the torque measuring apparatus with an improved responsibility.

When the output voltages $S_1$ shown in FIG. 8 were subjected to Fourier expansion, such a spectrum as shown in FIG. 9 was obtained.

Comparing this spectrum with that of the single sensor shown in FIG. 7, it has been found that the single sensor includes larger amplitudes over a range from the first order to higher order in the revolution of the rotating shaft as shown in FIG. 6 while the apparatus of the present invention very well eliminates such variations as shown in FIG. 9.

However, the actual measurement data of the present invention shows that the ninth uneliminated term is included in the output voltage $S_1$ as shown by the seventh equation.

Since the number of sensors can easily be increased in accordance with the present invention as described, however, the variations of rotation can easily be eliminated up to higher degrees, if required.

As seen from FIGS. 8 and 9, components of orders other than the ninth degree can be eliminated very well. The actual measurement data shows that the apparatus of the present invention provides uniform magnetic characteristics through all the magnetic sensors.

This also shows that the outer periphery of the rotating shaft is uniformly magnetized around the circumference thereof to provide uniform detection characteristics for all the magnetic circuit. And yet, all the detecting cores and magnetic detecting elements are uniformly arranged around the circumference of the rotating shaft.

This can easily be accomplished by uniformly magnetizing the rotating shaft in its axial direction and by forming a series of detecting cores into an integral detecting core ring unit.

Figure 10:
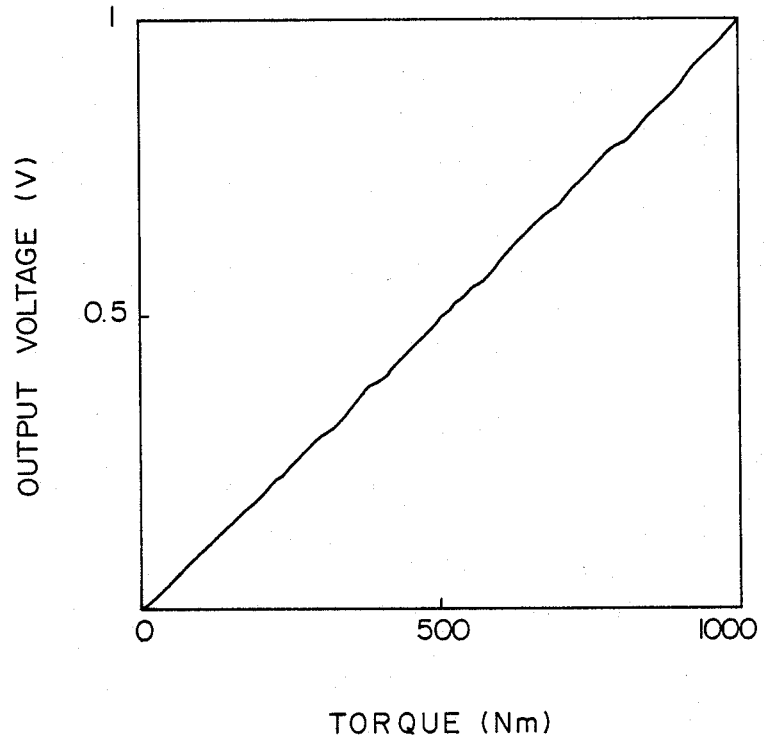
FIG. 10 illustrates the output characteristics of the torque measuring apparatus according to the first embodiment of the present invention.

FIG. 10 shows actual torque measurement data from the torque measuring apparatus according to the present invention As will be apparent from this figure, output voltages are substantially linearly changed according to variations of applied torque through a range from 0 Nm to 1000 Nm.

Thus, the present invention does not require a low-frequency filter which is used in the prior art and may provide a time lag. The torque measuring apparatus of the present invention can real-time measure various vehicle torques such as engine output torques, transmission output torques, vehicle speed torques and others.

Comparison of the Present Invention with the Prior Art

In order that the present invention is further understood, the torque measuring apparatus thereof will now be described in comparison with the prior art systems.

(1) In the prior art systems, the surface of the rotating shaft was magnetically divided and magnetized in its circumferential direction.

More particularly, the prior art systems comprise two or more sets of exciting coils including south and north pole set which are arranged adjacent and around the outer periphery of the rotating shaft. The magnetically divided peripheral sections of the rotating shaft are excited with the adjacent sections being magnetized in the opposite directions around the circumference of the rotating shaft.

However, such divided magnetization hardly provides a uniform magnetization through the excited sections of the rotating shaft. The sensors arranged around the circumference of the rotating shaft are difficult to have the same characteristics. Therefore, the variations of the rotational output from the rotating shaft cannot sufficiently be controlled.

On the contrary, the present invention is characterized by that the rotating shaft is excited and magnetized in its axial direction.

More particularly, the present invention provides an exciting coil wound around the outer periphery of the rotating shaft without contact so that the latter can easily be magnetized in its axial direction. As a result, the surface of the rotating shaft can uniformly be magnetized.

In accordance with the present invention, therefore, the magnetic sensors arranged around the circumference of the rotating shaft can have the same magnetic characteristics, such that any effect due to the variations of rotational output from the rotating shaft can be eliminated.

Since the present invention utilizes the rotating shaft as an exciting core for said exciting coil, it does not require any particular exciting core which is precisely machined as in the prior art. Thus, the torque measuring apparatus of the present invention can have its simple and inexpensive structure.

(2) The prior art torque measuring systems comprises a plurality of magnetic sensors arranged circumferentially adjacent to the outer periphery of the rotating shaft, each of the magnetic sensors consisting of an exciting element and a detecting element.

Thus, the prior art systems is very limited with respect to its space in which the magnetic sensors are disposed. The number of magnetic sensors cannot be increased and the variations of rotational output cannot sufficiently be eliminated.

On the contrary, the present invention uniformly magnetizes the rotating shaft in its axial direction such that a magnetic sensor will not be required to include an exciting element and a detecting element as a set.

Therefore, only a part functioning as a detecting element, that is, a detecting core may simply be disposed adjacent the outer periphery of the rotating shaft so that a number of magnetic sensors can very effectively be arranged within a limited space.

(3) Since the prior art systems comprise a detecting core ring including its magnetic circuit which is not separated from one another, interference tends to be created between each adjacent magnetic sensors. It is therefore difficult to increase the number of detecting elements or magnetic sensors.

On the contrary, the construction of the present invention comprises a plurality of magnetic sensor which include their magnetic circuits (each circuit consists of the detecting core and the detecting section of the detecting core in the rotating shaft) magnetically separated from one another. Accordingly, no interference will be created between each adjacent magnetic sensors so that an increased number of magnetic sensors can be arranged around the outer periphery of the rotating shaft.

In accordance with the present invention, furthermore, the detecting cores forming the magnetic sensors are configured into an integral ring surrounding the rotating shaft. Thus, the magnetic sensors can have the same detection characteristics such that they can more precisely be positioned around the rotating shaft.

On assembly, therefore, a detecting core and an exciting coil can more precisely be aligned with each other so that the measurement of torque will be made more accurately. The torque measuring apparatus of the present invention can more easily be manufactured and assembled and be more inexpensive as a whole.

Advantages of the Invention

As will be apparent from the foregoing, the present invention provides a torque measuring apparatus which can measure torques transmitted through a ferromagnetic rotating shaft without affection due to variations of the rotational output of the rotating shaft resulting from the non-uniformity of magnetic properties around the outer periphery of the rotating shaft. Therefore, precise measurement of torque can steadily and more precisely be made through a range from the stationary state of the rotating shaft to the high-speed revolution of the same.

Since the apparatus of the present invention uses an integral detecting core ring and a ring-shaped exciting coil, it can be assembled with an increased precision in providing the alignment between the detecting cores and the exciting coil. As a result, precise measurement of torque can be made. Further, the apparatus can more easily be manufactured and assembled and be inexpensive as a whole.

In accordance with the present invention, torques can be measured with a constant precision even when the rotating shaft is rotated to any rotational angle. Therefore, the torque measuring apparatus of the present invention does not require any low-frequency filter for separating and eliminating variations in the rotational output of the rotating shaft nor any means using a calculation relating to a reference signal for separating and eliminating the above variations. The measurement of transmitted torques can be real-time made with an improved responsibility. If the torque measuring apparatus of the present invention is applied, for example, to the power transmitting system in an automobile, the transmitted torques can promptly be detected such that the fuel injection and ignition timing can be real-time controlled to improve the fuel consumption very well.

Since the torque measuring apparatus of the present invention can measure the torque in the rotating shaft even under its stationary state as in measurements for various revolutions of the rotating shaft, the calibration of measured signals can very easily be made, unlike the prior art in which the cumbersome calibration was made while a torque was applied to a shaft being rotated at a predetermined revolution. For example, simply by applying a torque to the stationary shaft through a beam extending therefrom, the calibration can be accomplished more conveniently.

Specific Embodiments

Some specific embodiments will now be described with reference to the drawings, in which parts similar to those of the aforementioned prior art are denoted by similar reference numerals and their further description will be omitted.

First Embodiment

Construction

Figure 1:
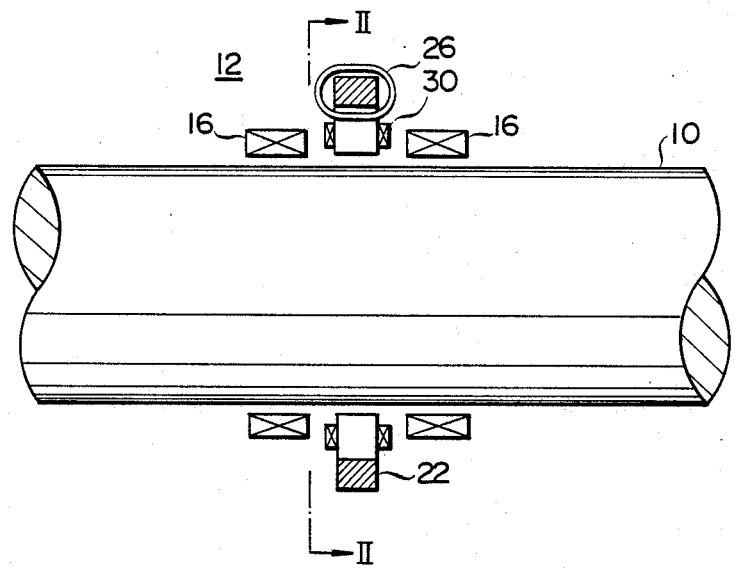
FIGS. 1 and 2 schematically illustrate a first preferred embodiment of a torque measuring apparatus according to the present invention.
Figure 2:
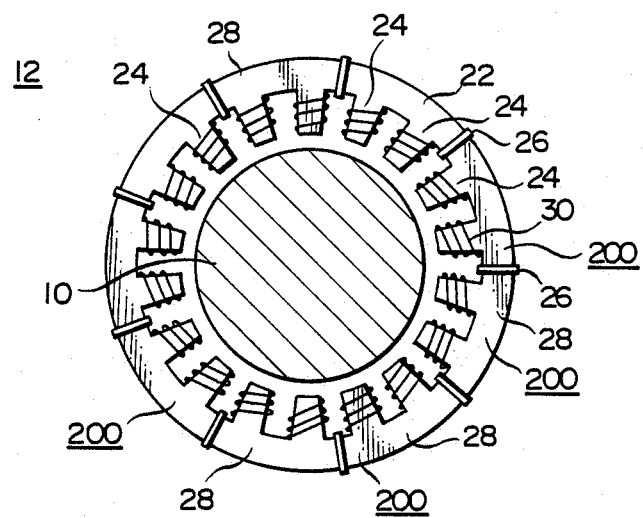
Figure 5:
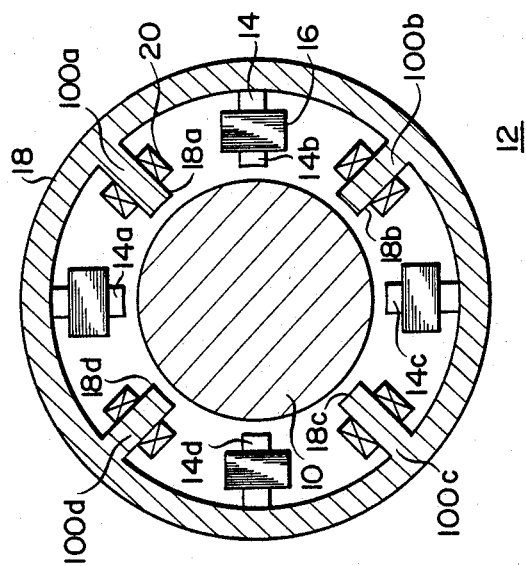
FIGS. 4 and 5 schematically illustrate one of the prior art torque measuring systems.
Figure 4:
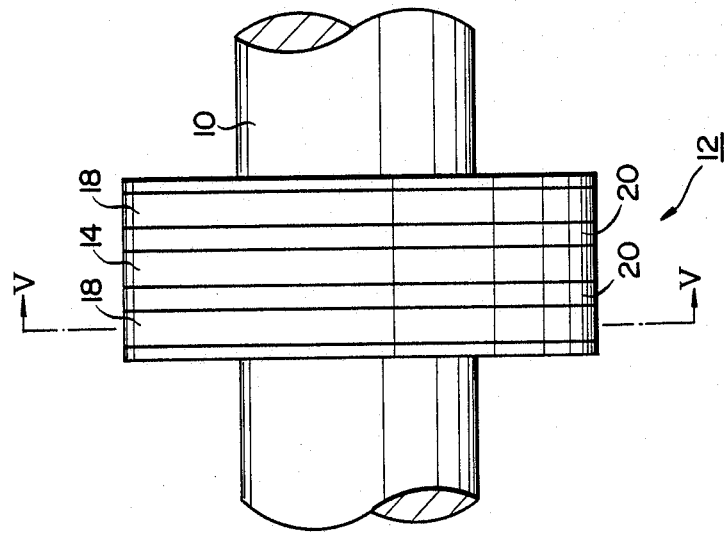

FIG. 1 is a schematic side view of a first preferred embodiment of a torque measuring apparatus constructed in accordance with the present invention. FIG. 2 is a cross-sectional view of the torque measuring apparatus, taken along a line II—II in FIG. 1.

The first embodiment of torque measuring apparatus comprises two exciting coils 16 wound around a rotating shaft of ferromagnetic material without contact and a detecting core ring 22 located centrally between the two exciting coils 16 and arranged around the rotating shaft 10 without contact.

The detecting core ring 22 includes nine detecting cores each of which has two magnetic pole pieces 24 equidistantly arranged around the inner periphery of the ring 22 and extending radially therefrom toward the center of the ring 22. Therefore, the total number of the magnetic pole pieces is equal to eighteen. Each of these magnetic pole pieces 24 has its inner end facing to and spaced apart from the outer peripheral surface of the rotating shaft 10 with a predetermined gap therebetween.

In the first embodiment, the detecting core ring 22 is formed of a lamination of ten adhered sheets of a material having its high magnetic permeability. This lamination is then electrospark machined to form an integral ring having eighteen magnetic pole pieces 24 so that the inner end faces of all the magnetic pole pieces 24 will be disposed on the circle facing to the outer periphery of the rotating shaft 10. Thus, a circular clearance is more precisely formed between the inner ends of the magnetic pole pieces 24 and the outer periphery of the rotating shaft 10. Under such a state, the detecting core ring 22 will be continuous both mechanically and magnetically around the circumference thereof.

The detection core ring 22 also includes a plurality of conductive rings 26, that is, short rings wound around the cross-section thereof. In the first embodiment, such conductive rings 26 total nine, one being located between two adjacent pairs of magnetic pole pieces.

The conductive rings 26 is made of a conductor being low in electric resistance and a closed circuit which divides the detecting core ring 22 into a plurality of independent detecting cores 28, as will be described.

Thus, each of the detecting cores 28 will form a magnetic circuit between that detecting core and the detecting section of the rotating shaft 10, the magnetic circuits so formed being magnetically separated from adjacent ones.

In order to detect the magnetic fluxes in such magnetic circuits, a detecting coil 30 is wound around the pair of the magnetic pole pieces 24 on the detecting core ring 22 for functioning as a magnetic detecting element.

In such a manner, a magnetic sensor 200 is formed by one detecting core 28 between each adjacent conductive rings 26 and one detecting coil 30 wound around two magnetic pole pieces 24 associated with that detecting core 28. Thus, the first embodiment of the torque measuring apparatus according to the present invention will have a total number of magnetic sensors 200 of nine, which are equidistantly arranged around the outer periphery of the rotating shaft 10.

In the first embodiment, furthermore, the exciting coils 16 and the detecting core ring 22 are positioned axially and circumferentially around the rotating shaft 10 and spaced apart from the outer periphery of the rotating shaft 10 with a constant clearance therebetween.

As shown in FIG. 3, the two exciting coils 16 are connected in series with each other and are driven by alternating currents to magnetize the rotating shaft 10. A magnetization component created on the rotating shaft in its circumferential direction due to an applied torque is detected as an electromotive force by the detecting coils 30 wound around the respective detecting cores 28 which form nine magnetic circuits independent from one another.

These nine detecting coils 30 are connected in series with one another and adapted to supply output signals to a differential amplifier 61 which in turn generates an output voltage obtained by summing detecting voltages from the nine detecting coils 30. The output voltage from the differential amplifier 61 is decremented into one-ninth by means of a divider 62 to form DC voltage which is proportional to the level of the applied torque and supplied to an output terminal 64 through a rectifier 63. Output voltage at the output terminal can be used as various torque signals for meter torque indication, measurement and control.

In such a circuit, variations of the output from the rotation of the shaft 10 can effectively be eliminated in accordance with the seventh equation mentioned above since the nine detecting coils 30 are connected in series with one another and operatively coupled with the differential amplifier 61. Creation of common noise in the detecting coils 30 can effectively be eliminated so that the resulting S/N ratio will be superior with respect to any external electromagnetic interference.

Function:

The above arrangement of the torque measuring apparatus can operate as follows:

Magnetization of the Rotating Shaft

The rotating shaft 10, which is adapted to transmit torques, is axially magnetized by alternate exciting current which is applied to the exciting coils 16.

At this time, magnetic fluxes created by this magnetizing will substantially pass through the rotating shaft 10 since the exciting coils 16 are coaxially wound around the rotating shaft 10 which in turn functions as an exciting core for the exciting coils 16. As a result, the outer periphery of the rotating shaft 10 will be magnetized uniformly around the circumference thereof in the same direction.

In the first embodiment, since two exciting coils 16 are driven by the same alternate exciting currents, their involved effect can provide very uniform and stable magnetization for the rotating shaft 10 between the two exciting coils 16.

Since the detecting core ring 22 is positioned centrally between the exciting coils 16, the magnetization of the rotating shaft can be further uniform even at a detection area for the detecting cores 28.

In such a manner, the first embodiment of the present invention can provide a uniform characteristic from one of the magnetic sensors 200 to another, which are arranged around the rotating shaft 10, because of the uniform magnetization.

Measurement of Torque

When a torque is applied to the rotating shaft 10 under the aforementioned state, magnetization components will be created circumferentially around the rotating shaft 10 due to the magnetostriction. Each of these magnetization components is detected by a magnetic sensor 200 which is defined by a detecting core 28 consisting of a pair of magnetic pole pieces in the detecting core ring 22 and associated detecting coils 30.

At this time, the output detection voltage from the detecting coil 30 in each of the magnetic sensors 200 has a value proportional to the level of the transmitted torque.

Function of Conductive Ring

In the first embodiment, two magnetic sensors 200 adjacent to each other are magnetically separated from each other through a conductive ring 26. Therefore, no interference will be created between two magnetic detection circuits adjacent to each other. This can improve the precision when the torque is measured.

In other words, the detecting cores 28 of the first embodiment are formed at first by using the magnetically and mechanically continuous core ring which has 18 magnetic pole pieces 24.

When a plurality of conductive rings 26 are provided on the detection core ring 22 as described, the latter will have its magnetic circuits separated from one another by means of the conductive rings 26. As a result, one magnetically independent detecting core 28 will be defined by a part of the detecting core ring between each adjacent conductive rings 26 and two magnetic pole pieces 24.

Each of the detecting cores 28 faces the rotating shaft 10 through the clearance to form a magnetically independent magnetic circuit therebetween.

Thus, by winding detecting coils 30 around the respective magnetic pole pieces 24 of each of the detecting cores 28 to form one magnetic sensor 200, the latter will have a magnetic circuit which is completely independent magnetically from the other magnetic sensors.

In the first embodiment, nine magnetic sensors 200 independent from one another will be arranged around the rotating shaft 10 since the detecting core ring 22 is magnetically divided by nine conductive rings 26.

Output signals from these nine magnetic sensors 200 are added in accordance with the seventh equation mentioned previously to obtain an output voltage $S_1$, such that the transmitted torque can more precisely be measured by the torque measuring apparatus according to the present invention.

The separation of magnetic circuits by the conductive rings 26 is based on Faraday's law defining "an electromotive force created in a loop by the electromagnetic induction is proportional to a rate at which a magnetic flux intersecting that circuit decreases" or Lenz's law defining "an electromotive force created by the electromagnetic inductin is in such a direction that currents preventing change of magnetic flux flows".

Since an electrical resistance of the conductive ring 26 is low, the conductive rings 26 will provide currents for preventing change of the magnetic flux intersecting these conductive rings 26. Thus, the alternate magnetic flux cannot intersect the conductive rings 26. As a result, a number of detecting cores 26 on the same detecting core ring 22 will magnetically be separated from one another.

This can be represented by Maxwell's equation of electromagnetic induction:

$$\mathrm{curl}\, E = -d/dt\, B \tag{8}$$

where E is electric field vector, t is time and B is magnetic flux density vector.

Now assuming that a magnetic flux B intersects a conductive ring 26, a magnetic field E will be induced along the conductive ring 26. Since the conductive ring 26 has its electric resistance substantially equal to zero, the induced electric field E is also equal to zero.

Therefore, the eighth equation can be rewritten by:

$$-d/st\, B = \mathrm{curl}\, E = 0 \tag{9}$$

Therefore, the magnetic flux B intersecting the conductive ring 26 will not be variable through the passage of time.

As will be apparent from the above description, the first embodiment of the present invention will provide a plurality of magnetic circuit independently and magnetically separated from one another by the use of conductive rings 26 without need of a particular separation space. Therefore, the present invention can provide the same torque measuring apparatus as includes, adjacent to the outer periphery of the rotating shaft 10, nine magnetic sensors 200 each comprising U-shaped detecting cores 28 and detection coils 30 each wound around the legs of the corresponding detecting core 28.

Since the detecting core ring 22 is integrally formed, moreover, the respective magnetic sensors 200 are identical in configuration and yet can easily be arranged around the outer periphery of the rotating shaft with an improved precision.

As a result, the apparatus of the first embodiment can provide the same characteristic from one magnetic sensor 200 to another and yet can very easily be assembled.

Since the detecting core ring 22 is an integral unit, furthermore, the mechanical strength of the apparatus can extremely be increased.

Actual Measurement of Torque

Referring next to FIGS. 8 and 9, there are shown measurement data of transmitted torques in the torque measuring apparatus according to the first embodiment, wherein output singals $S_1$ are represented as the sum of the outputs from the magnetic sensors 200 in accordance with the seventh equation.

As described previously, the torque measuring apparatus of the first embodiment comprises nine magnetic sensors 200 which are arranged equidistantly around the circumference of the rotating shaft. As shown in FIG. 8, therefore, the apparatus can provide output signals $S_1$ which effectively eliminate the variations of the rotational output in the rotating shaft.

FIG. 9 shows a spectrum which is obtained by subjecting the output signals $S_1$ so obtained to Fourier expansion. As seen from this figure, the torque measuring apparatus of the first embodiment extremely effectively eliminates orders other than the ninth order.

Advantages of the First Embodiment

The first embodiment of the present invention can provide the same characteristic from one magnetic sensor 200 to another by axially exciting the rotating shaft 10 and uniformly magnetizing the outer periphery thereof around the circumference of the rotating shaft 10.

Since the first embodiment utilizes the rotating shaft 10 itself as an exciting core for the exciting coils 16, it does not require any exclusive exciting core. Therefore, the whole apparatus can be of a simplified construction which can easily be manufactured.

By using a detecting core ring 22 which is magnetically divided by a plurality of conductive rings 26, there are formed a plurality of magnetic sensors 200 as a unit, which include magnetic circuits independent from one another and which will not interfere with one another. The number of magnetic sensors 200 around the rotating shaft can be increased in comparison with the prior art. In addition, the dimensional precision of the magnetic sensors 200 relating to its shape and arrangement can easily be improved.

For such reasons, the apparatus of the first embodiment can effectively eliminate the variations of rotational output due to the non-uniformity of magnetic property on the outer periphery of the rotating shaft 10. Therefore, transmitted torques can more accurately and steadily be measured by the torque measuring apparatus of the present invention with an improved responsibility.

Particularly, the apparatus of the first embodiment can measure the transmitted torques with a precision extremely higher than those of the prior art systems. In addition, as seen from FIG. 9, the apparatus can easily eliminate the variations of the rotational output from the torque measuring apparatus up to its higher orders. Therefore, the apparatus of the first embodiment can more accurately measure the torques even at a very low range of revolutions.

Moreover, the apparatus of the first embodiment can measure transmitted torques with a sufficiently practical precision even if it utilizes a rotating shaft 10 made of any steel material which is not homogeneous in its magnetic property.

Second Embodiment

Figure 11:
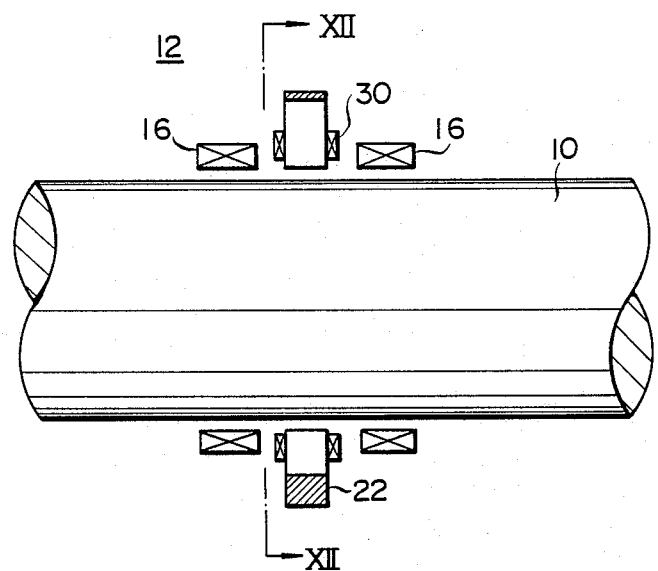
FIGS. 11 and 12 schematically illustrate a second preferred embodiment of the torque measuring apparatus according to the present invention.
Figure 12:
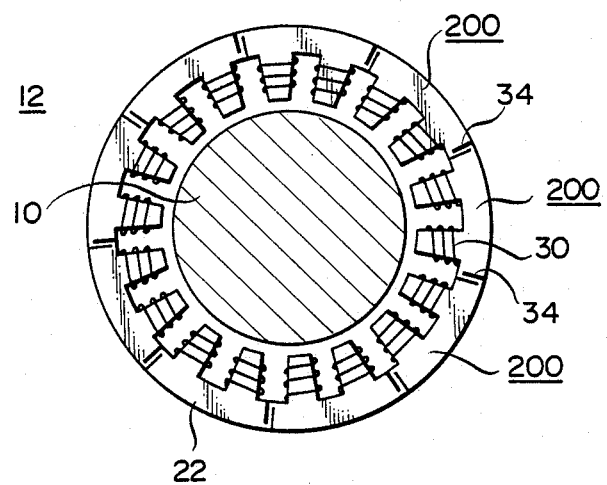

Referring now to FIGS. 11 and 12, there is shown a second preferred embodiment of the present invention, in which the conductive rings 26 of the detecting core ring 22 in the first embodiment are replaced by one or more air gaps 34. The detecting core ring 22 of the second embodiment is an integral molding which is formed by electrospark machining a lamination of sheets made of a high magnetic permeability into a ring having 18 magnetic pole pieces 24 formed therein, coating the ring with a non-magnetic material and machining the air gaps 34 in the coated ring. By using the detecting core rings 22, the magnetic circuits will have the same magnetic characteristics. Furthermore, the magnetic sensors 200 can properly be arranged relative to the rotating shaft.

As in the first embodiment, nine of the air gaps 34 are formed in the detecting core ring 22 around the circumference thereof at the same positions as those of the conductive rings 26 in the first embodiment.

Since the air gaps 34 have a magnetic reluctance extremely larger than the detecting core ring 22, the detection core ring 22 will magnetically be divided into a plurality of magnetic circuits while maintaining its mechanical connection. This is because the magnetic permeability of the air gaps is very small level, for example, betwewen one-hundreth and one-thousandth that of the remaining parts of the core ring.

On machining the air gaps 34, they may be formed into grooves or to leave parts of the detecting core ring 22, such that the magnetic circuits will magnetically be separated from one another in the presence of the magnetic reluctance which is large at the air gaps 34.

As described above, the apparatus of the second embodiment is the same construction as that of the first embodiment except the air gaps 34 used in place of the conductive rings 26, and can provide the same function and advantages as those of the first embodiment. Since the detecting core ring 22 is not required to have any conductive ring 26 and simply formed with the air gaps 34 on machining, the second embodiment can be manufactured more easily than the first embodiment.

Third Embodiment

Figure 13:
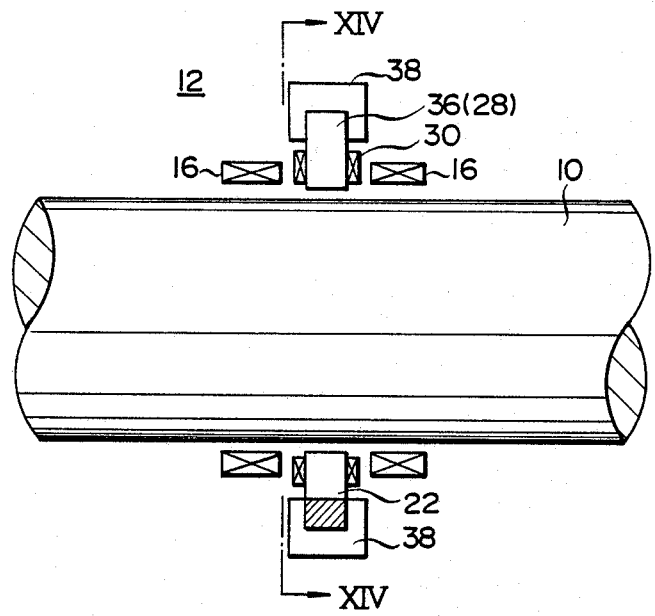
FIGS. 13 and 14 schematically illustrate a third preferred embodiment of the torque measuring apparatus according to the present invention.
Figure 14:
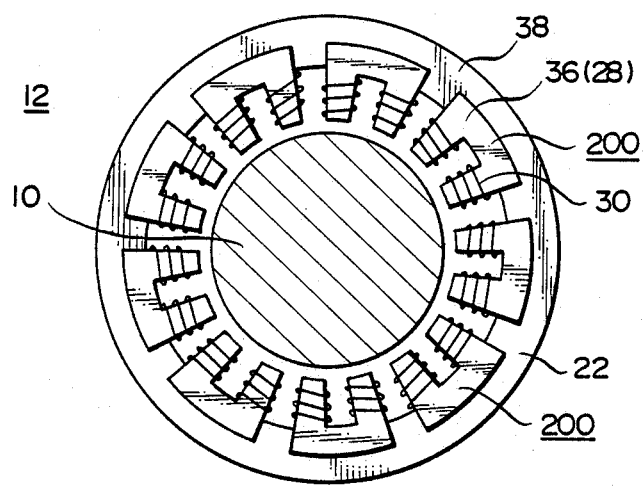

Referring next to FIGS. 13 and 14, there is shown a third preferred embodiment of the present invention, in which a plurality of independent U-shaped cores 36 are used in place of the detecting cores 28 of the detecting core ring 22. Each of the U-shaped cores 36 is firmly held in the detecting core ring 22 by a support 38 of non-magnetic material. The detecting cores 36 have their inner ends positioned on the common circle extending coaxially relative to the center of the detecting core ring 22.

As in the first and second embodiments, nine of the U-shaped cores 36 are supported on the detecting core ring by the support 38 to form an integral unit.

Although the third embodiment provides that the support 38 made of ceramic material, it may be formed of any non-magnetic material such as aluminum, copper, non-magnetic metals, plastics and others.

Since the detecting core ring 22 includes the detecting core means formed of the U-shaped cores 36 which are completely independent from one another and provide a larger air gap between each adjacent cores 36, the separation of magnetic circuits can be accomplished very well.

As described above, the third embodiment is of the same construction and function as those of the first embodiment except that it has the detecting core ring 22 including the U-shaped cores 36.

Since the apparatus of the third embodiment has the U-shaped cores 36 each of which is completely independent from adjacent cores, the separation of magnetic circuits can be accomplished very well. Particularly, this serves to adjust and match the properties of the magnetic sensors 200. It is therefore required to use an increased number of steps for manufacturing the apparatus. However, such an arrangement of the torque measuring apparatus provides extremely precise measurement of torque.

Since the U-shaped cores 36 are more precisely arranged around the outer periphery of the rotating shaft 10 by means of the support 38 and thereafter the inner end faces of the magnetic pole pieces 24 facing the rotating shaft 10 are integrally shaped, a clearance having its uniform thickness may easily be formed between the inner end faces of the magnetic pole pieces 24 of the U-shaped cores 36 and the outer periphery of the rotating shaft 10 so that the magnetic sensors 200 can have the same characteristics.

When the diameter of the rotating shaft 10 is very large, for example, equal to 300 mm or 1000 mm, the detecting core ring 22 may be divided into a plurality of sections each having a U-shaped core 36 before they are assembled into a unit. This is advantageous in that the apparatus can be manufactured more precisely and the materials can utilized more effectively.

Fourth Embodiment

Figure 15:
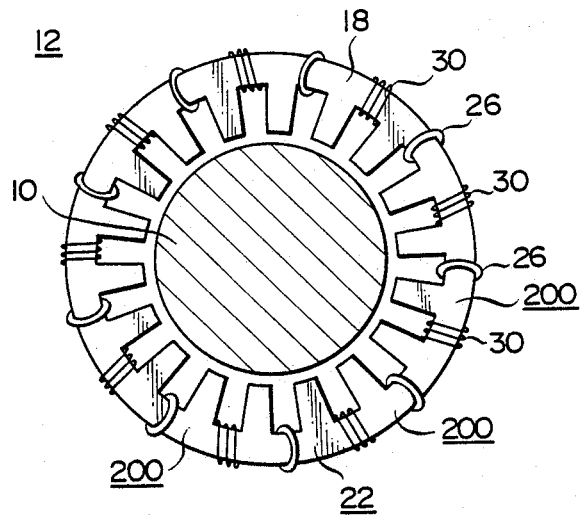
FIG. 15 schematically illustrates a fourth preferred embodiment of the torque measuring apparatus according to the present invention.

FIG. 15 shows a fourth preferred embodiment of the present invention, in which detecting coils 30 are wound around the arcuate parts of the respective detecting cores 28 rather than the magnetic pole pieces 24 in the first embodiment.

Similarly, nine of such detecting coils 30 are mounted on the detecting core 28.

Each of the detecting coils 30 is easily be formed by using an improved torodial winding process which is adapted to wind a winding concentrically onto each of the arcuate parts.

As will be apparent from the foregoing, the apparatus of the fourth embodiment is of the same construction and function as those of the first embodiment, except that the detecting coils 30 are wound around the respective arcuate sections of the detecting core ring 22.

In accordance with the fourth embodiment of the present invention, the winding process of the detecting coils 30 may be simplified. This is very advantageous in an automatic assembly process.

The winding of the detecting coils 30 around the arcuate sections of the detecting core ring 22 is further advantageous in the number of turns because of space than around the magnetic pole pieces 24.

Fifth Embodiment

Figure 16:
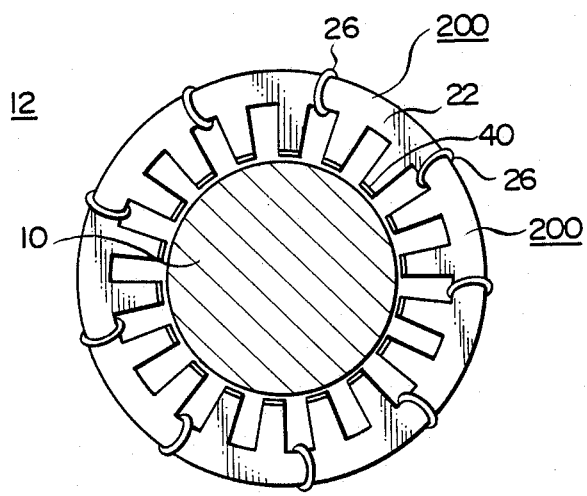
FIG. 16 schematically illustrates a fifth preferred embodiment of the torque measuring apparatus according to the present invention.

FIG. 16 shows a fifth preferred embodiment of the present invention, in which the detecting coils 30 used in the first embodiment are replaced by Hall elements 40.

Although the first embodiment provides the detecting coils 30 are adapted to detect magnetization components created circumferentially around the rotating shaft 10 under the electromagnetic induction as induced voltages, the fifth embodiment is adapted to variable magnetization depending on torques by the use of magnetic detecting elements 40 such as Hall elements or magnetoresistance elements which are disposed within the respective magnetic circuits.

In the fifth embodiment, each of the magnetic detecting elements 40 is a Hall element. Eighteen Hall elements are applied to the inner end faces of the magnetic pole pieces 24 facing the outer periphery of the rotating shaft. It is important that these hole elements have the substantially same characteristics from one element to another.

As described above, the fifth embodiment has the same and construction and function except that the Hall elements 40 are used in place of the detecting coils 30.

In addition, the apparatus of the fifth embodiment provides a magnetic sensor 200 which can more simply be manufactured since no detecting coil is required and which can extremely be reduced in thickness since the thickness of each of the Hall elements 40 is smaller than that of the detecting coil 30. In this embodiment, the magnetic detecting elements in one of the magnetic sensors are applied to the opposite end surfaces of each detecting core, but this invention is not limited to this and may be applied to at least one of the magnetic detecting elements which is effectively applied in the magnetic circuit of the magnetic sensor between the detecting core and the rotating shaft.

Sixth Embodiment

Figure 17:
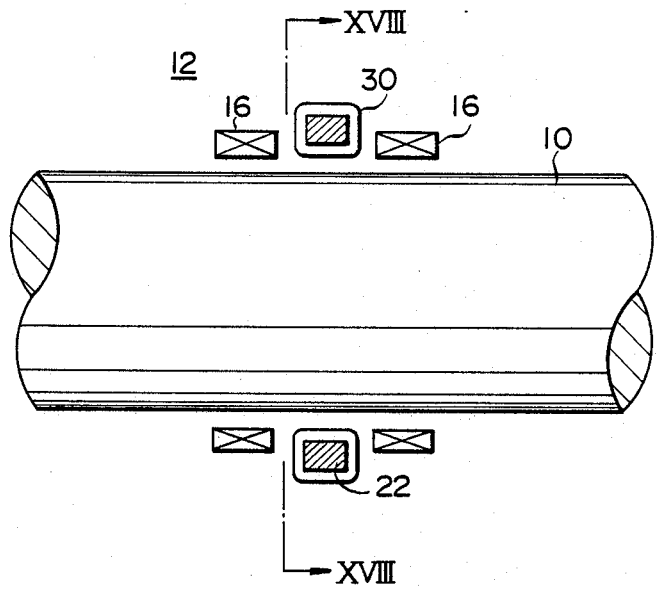
FIGS. 17 and 18 schematically illustrate a sixth preferred embodiment of the torque measuring apparatus according to the present invention.
Figure 18:
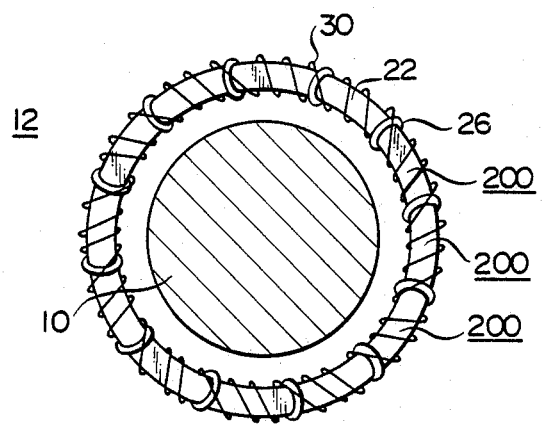

Referring next to FIGS. 17 and 18, there is shown a sixth preferred embodiment of the present invention, in which the detecting core ring 22 of the first embodiment is replaced by a detecting core ring of substantially completely circular configuration having no magnetic pole pieces 24. Such a detecting core ring includes a continuous detecting coil 30 wound therearound in the circumferential direction.

In the sixth embodiment, the detecting core ring 22 is magnetically divided into nine detecting cores 28 by the use of nine conductive rings 26 as in the first embodiment. Without any magnetic pole piece, each of the detecting cores 28 can function as a magnetic sensor 200 which is faced to the rotating shaft 10 and forms a magnetic circuit.

The detecting coil 30, which is continuously wound circumferentially around the detecting cores 28, provides an output voltage E equal to the sum of detection voltages in the magnetic sensors 200. As in the first embodiment, therefore, the sixth embodiment can measure transmitted torques very well.

However, the sixth embodiment has a problem in that its sensitivity of detection is slightly reduced since the magnetic connection between the rotating shaft 10 and the detecting cores 28 is relatively small due to no magnetic pole piece 24. On the contrary, the sixth embodiment is advantageous in that the detecting core ring 22 can more easily be manufactured since there is no magnetic pole piece. Furthermore, the detecting core ring 22 can be reduced in its radial dimension by the radial length of the magnetic pole pieces to decrease the external dimension of the detecting core ring 22. As a result, the torque measuring apparatus can be simplified in construction.

Since the detecting coil 30 is of a continuous toroidal winding, moreover, the torque measuring apparatus of the sixth embodiment can more easily be manufactured.

Seventh Embodiment

Figure 19:
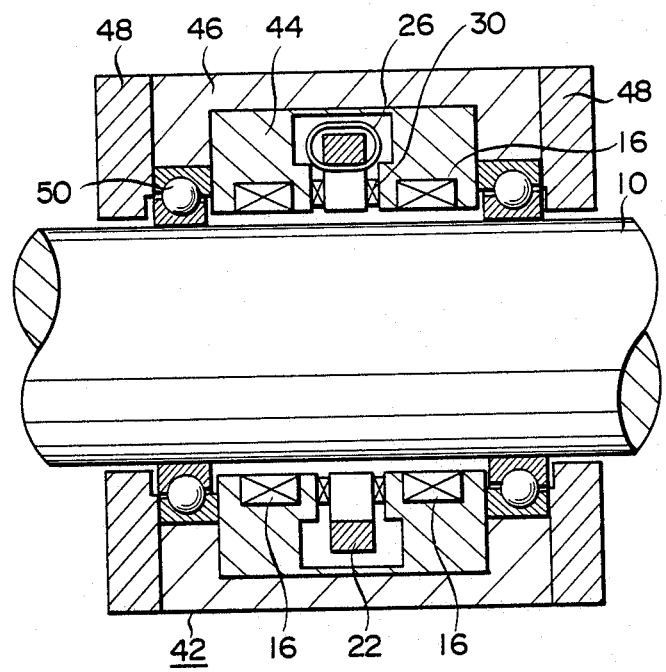
FIG. 19 schematically illustrates a seventh preferred embodiment of the torque measuring apparatus according to the present invention.

FIG. 19 shows a seventh preferred embodiment of the present invention which has its construction basically similar to the constructin of the first embodiment. However, the seventh embodiment is characterized in that it comprises a casing of ferromagnetic material 42 containing the exciting coils 16 and the detecting core ring 22. A magnetic circuit of the exciting is formed between the casing 42 and the rotating shaft 10.

The casing 42 is of a cylindrical configuration which comprises a non-magnetic coil supporting portion 44 for supporting the exciting coils 16 and the detecting core ring 22, a sleeve of ferromagnetic material 46 surrounding the coil supporting portion 44 and ferromagnetic discs 48 provided on either side of the sleeve 46. The cylindrical casing 42 is rotatably mounted on the rotating shaft 10 through bearings 50.

Thus, the exciting coils 16 and the detecting core ring 22 can be maintained by means of the casing 42 at constant positions relative to the rotating shaft 10 as the latter is being rotated at any revolution speed.

Since the casing 42 is made of ferromagnetic material, a magnetic exciting flux created on driving of the exciting coils 16 will pass through a magnetic circuit of the exciting which is in the form of a closed loop consisting of the rotating shaft 10, discs 48 and sleeve 46.

Thus, the magnetic reluctance in the magnetic exciting circuit can be sufficiently reduced so that the rotating shaft 10 will effectively be magnetized by the use of less exciting currents and the decreased number of windings in the exciting coils 16.

Since the magnetic circuit of the exciting is in the form of a closed loop in the seventh embodiment, the apparatus will not be influenced by an external magnetic field and can steadily measure torques.

Although the present invention has been described as to the first through seventh embodiments wherein the detecting core ring 22 is in the form of a lamination of adhered sheets, the invention is not limited to this and may be applied by using any other material having high magnetic permeability, such as ferrite or silicon steel ingots.

The torque measuring apparatus of the present invention can be applied to any torque transmitting sectoin in rotatably driving systems, for example, to automobiles at their crankshafts, transmission output shafts, propeller shafts, wheel axles and others.

The torque measuring apparatus of the present invention can similary be applied to any other application which utilizes a shaft having its increased diameter, such as ship output shafts, rolling rolls, machine tool shafts, testing machine shafts, robot shafts and others.

We claim:

1. A torque measuring apparatus comprising magnetic detection means for non-contact measuring strains in a rotating shaft of ferromagnetic material which is adapted to transmit torques, the detected strains being used to determine the levels of transmitted torques, said magnetic detection means comprising:

exciting coil means wound around the outer periphery of said rotating shaft and adapted to magnetize said rotating shaft in its axial direction;

detecting core ring means in the form of an integral unit which includes a plurality of detecting cores arranged around the circumferential area of the rotating shaft to form a ring, each of said detecting cores forming an independent magnetic circuit between said detecting core and said rotating shaft; and magnetic detecting elements for detecting variable magnetic fluxes in each of said detecting cores depending on the level of the transmitted torque;

whereby the strains in said rotating shaft can be measured in non-contact manner, based on the sum of output signals from said magnetic detecting elements.

2. A torque measuring apparatus as defined in claim 1 wherein said exciting coil means includes two exciting coils arranged around the outer periphery of said rotating shaft with a predetermined space interval and wherein said detecting core ring means is positioned midway between said two exciting coils.

3. A torque measuring apparatus as defined in claim 1 wherein said detecting core ring means includes a core ring disposed coaxially around the outer periphery of said rotating shaft and a plurality of conductive rings intersecting said core ring across the cross-section of said core ring, said core ring being divided by said conductive rings into a plurality of detecting cores each of which has an independent magnetic circuit.

4. A torque measuring apparatus as defined in claim 3 wherein said core ring includes an even number of magnetic pole pieces ectending radially from the inner periphery of said core ring toward the center thereof and being arranged equidistantly around the inner periphery of said core ring and wherein each of said conductive rings is arranged relative to said core ring between two pairs of said magentic pole pieces.

5. A torque measuring apparatus as defined in claim 4 wherein said magnetic detecting elements comprise detecting coil means wound around the respective one of said magnetic pole pieces in said detecting core ring means.

6. A torque measuring apparatus as defined in claim 1 wherein said detecting core ring means includes a core ring arranged coaxially around the outer periphery of said rotating shaft and a plurality of air gaps formed in said core ring around the circumference thereof with a predetermined space interval, said core ring being divided by said air gaps into a plurality of detecting cores each of which has an independent magnetic circuit.

7. A torque measuring apparatus as defined in claim 6 wherein each of said air gaps is in the form of a groove formed in said core ring and wherein a plurality of such grooves are formed in said core ring circumferentially with a predetermined space interval.

8. A torque measuring apparatus as defined in claim 1 wherein said detecting core ring means includes a plurality of U-shaped detecting cores which are assembled into an integral ring-shaped unit by using a non-magnetic body.

9. A torque measuring apparatus as defined in claim 1 wherein said magnetic detecting elements comprise a plurality of detecting coils each of which is wound around an arcuate part of each of said detecting cores.

10. A torque measuring apparatus as defined in claim 1 wherein said magnetic detecting elements are mounted on said detecting cores in such a manner that said magnetic detection elements face the rotating shaft of ferromagnetic material.

11. A torque measuring apparatus as defined in claim 10 wherein each of said magnetic detecting elements comprises a Hall element.

12. A torque measuring apparatus as defined in claim 10 wherein each of said magnetic detecting elements comprises a magnetoresistance element.

13. A torque measuring apparatus as defined in claim 1 wherein said detecting core ring means is in the form of a substantially circular configuration having no magnetic pole piece and wherein said magnetic detecting elements comprise a detecting coil would continuously across the cross-section thereof and in the circumferential direction, said detecting coil being adapted to output the sum of detection voltages.

14. A torque measuring apparatus as defined in claim 1 wherein said exciting coil means and detecting core ring means are contained within a casing of ferromagnetic material, whereby a magnetic exciting circuit can be formed between said casing and said rotating shaft.

15. A torque measuring apparatus as defined in claim 14 wherein said casing of ferromagnetic material is in the form of a cylinder including a coil supporting portion of non-magnetic material for supporting said exciting coil means and detecting core ring means, a sleeve of ferromagnetic material for supporting the outer periphery of said coil supporting portion, and discs of ferromagnetic material located on either side of said sleeve, said cylindrical casing being rotatably mounted on said rotating shaft through bearing means.

16. A torque measuring apparatus as defined in claim 1, further comprising an arithmetic processing circuit for calculating the sum of output signals from the magnetic detecting elements to provide a calculated value and for generating a direct output voltage proportional to a torque being transmitted, based on said calculated value.

17. A torque measuring apparatus as defined in claim 16 wherein said detecting core ring means includes nine detecting cores arranged equidistantly around the outer peripheral area of said rotating shaft to form a ring, each of said nine detecting cores forming an independent magnetic detection circuit between that detecting core and said rotating shaft;

each of said nine detecting cores having two magnetic pole pieces disposed on its inner wall with a predetermined space interval and extending radially toward the center of said rotating shaft;

said magnetic detecting elements comprising detecting coils each of which is wound around each of said magnetic pole pieces on the detecting cores;

two of said exciting coils being disposed around the outer periphery of said rotating shaft on either side of the same;

said arithmetic processing circuit comprising:

a series circuit connecting the detecting coils on said nine detecting cores in series and adapted to output the sum of output voltages from said detecting coils;

a differential amplifier for amplifying the output voltage of said series circuit with a predetermined magnification;

a divider for calculating a value equal to one-ninth the output voltage of said differential amplifier; and a rectifier for rectifying the output voltage from said divider to form a DC output voltage proportional to the torque being transmitted.

* * * * *